US012679317B2

(12) United States Patent
Weh et al.

(10) Patent No.: US 12,679,317 B2
(45) Date of Patent: Jul. 14, 2026

(54) HYDRAULIC BLOCK OF A POWER BRAKE SYSTEM

(71) Applicant: Robert Bosch GmbH, Stuttgart (DE)

(72) Inventors: Andreas Weh, Sulzberg (DE); Michael Wilcox, Charleston, SC (US); Stefan Abare, Summerville, SC (US)

(73) Assignee: ROBERT BOSCH GMBH, Stuttgart (DE)

( * ) Notice: Subject to any disclaimer, the term of this patent is extended or adjusted under 35 U.S.C. 154(b) by 404 days.

(21) Appl. No.: 18/340,160

(22) Filed: Jun. 23, 2023

(65) Prior Publication Data

US 2024/0034291 A1 Feb. 1, 2024

(30) Foreign Application Priority Data

Jul. 28, 2022 (DE) .................... 10 2022 207 749.0

(51) Int. Cl.
| | |
|---|---|
| *B60T 17/02* | (2006.01) |
| *B60T 8/36* | (2006.01) |
| *B60T 8/40* | (2006.01) |

(52) U.S. Cl.
CPC ............ B60T 8/368 (2013.01); B60T 8/4081 (2013.01)

(58) Field of Classification Search
CPC ........ B60T 13/745; B60T 8/368; B60T 8/409; B60T 8/4086
See application file for complete search history.

(56) References Cited

U.S. PATENT DOCUMENTS

| | | | |
|---|---|---|---|
| 2007/0200430 A1* | 8/2007 | Tani ...................... | B60T 8/4081 |
| | | | 303/137 |
| 2014/0109565 A1* | 4/2014 | Chiba ..................... | B60T 8/409 |
| | | | 60/445 |
| 2015/0298675 A1* | 10/2015 | Mayr .................... | B60T 17/043 |
| | | | 92/169.1 |
| 2016/0031424 A1* | 2/2016 | Weh ........................ | B60T 8/409 |
| | | | 60/533 |
| 2019/0061720 A1* | 2/2019 | Kunz ...................... | B60T 8/409 |
| 2019/0092307 A1* | 3/2019 | Kim ......................... | G05G 5/04 |
| 2019/0100182 A1* | 4/2019 | Leiber .................... | B60T 8/368 |
| 2020/0139949 A1* | 5/2020 | Dolmaya .............. | B60T 8/4081 |
| 2022/0203948 A1* | 6/2022 | Weh ........................ | B60T 7/042 |
| 2024/0001899 A1* | 1/2024 | Stanojkovski ........ | B60T 13/686 |

FOREIGN PATENT DOCUMENTS

| | | |
|---|---|---|
| DE | 102017204407 A1 | 9/2018 |
| DE | 102018220573 A1 | 6/2020 |

* cited by examiner

*Primary Examiner* — Bradley T King
(74) *Attorney, Agent, or Firm* — NORTON ROSE FULBRIGHT US LLP

(57) ABSTRACT

A hydraulic block of a power brake system. The hydraulic block is formed as a cuboid housing block, and forms a power cylinder bore for receiving a power cylinder. The hydraulic block has two receptacles for pedal travel simulators and is configured so as to be hydraulically connectable to a master brake cylinder, a brake fluid reservoir, and a driving dynamics control system.

8 Claims, 4 Drawing Sheets

HYDRAULIC BLOCK OF A POWER BRAKE SYSTEM

CROSS REFERENCE

The present application claims the benefit under 35 U.S.C. § 119 of German Patent Application No. DE 10 2022 207 749.0 filed on Jul. 28, 2022, which is expressly incorporated herein by reference in its entirety.

FIELD

The present invention relates to a hydraulic block of a power brake system and to a brake system having such a hydraulic block.

BACKGROUND INFORMATION

German Patent Application No. DE 10 2018 220 573 A1 relates to a hydraulic block for a hydraulic aggregate of a hydraulic power-assisted vehicle braking system. The hydraulic block has a power cylinder bore perpendicular to the master brake cylinder bore and a receptacle for a pedal travel simulator. The receptacle for the pedal travel simulator is mounted parallel to the power cylinder bore in the hydraulic block.

In German Patent Application No. DE 10 2017 204 407 A1, a hydraulic block is described for a hydraulic power-assisted vehicle braking system. There, connections for wheel brakes are attached along a transverse side with connections for a brake fluid reservoir, or along a longitudinal side in a large side of the hydraulic block.

SUMMARY

An object of the present invention is to provide a hydraulic block and a brake system for vehicles with high-volume brakes and high elasticity, which saves installation space and is economical.

This object may be achieved by a hydraulic block of a power brake system having the features of the present invention. Additionally, the present invention provides a brake system. Advantageous developments and example embodiment of the present invention are disclosed herein.

The present invention provides a hydraulic block of a power brake system, formed as a cuboid housing block. According to an example embodiment of the present invention, the hydraulic block forms a power cylinder bore for receiving a power cylinder, the hydraulic block having two receptacles for pedal travel simulators and being designed so as to be hydraulically connectable to a master brake cylinder, a brake fluid reservoir, and a driving dynamics regulating system.

According to an example embodiment of the present invention, the housing block is preferably formed from an extruded aluminum block. The power cylinder forms a power pressure generator, which moves a piston by an electric motor to generate pressure. A pedal travel simulator is a component with which a braking sensation is hydraulically simulated at the brake pedal. In contrast to the related art, for a high-volume motor vehicle, instead of one high-volume pedal travel simulator, two pedal travel simulators are provided, each having a smaller volume. Using two pedal travel simulators does not increase the maximum external dimensions of such a hydraulic block with two pedal travel simulators compared to one pedal travel simulator. The installation space required in the motor vehicle is not increased by this.

According to an example embodiment of the present invention, the hydraulic block also does not have a master brake cylinder or a brake fluid reservoir, which means that the installation space required for such a hydraulic block can be kept low. According to an example embodiment of the present invention, the master brake cylinder is housed in a separate unit. Although the hydraulic block is intended for a braking system with high-volume brakes, it can be arranged in such a motor vehicle in a way that saves installation space and is economical.

In a preferred embodiment of the present invention, the pedal travel simulators are hydraulically connected to one another in parallel. The hydraulic pressure thus acts at the same level on both pedal travel simulators. Such a configuration ensures that if one of the pedal travel simulators is defective, pedal travel simulation continues to be provided by a pedal travel simulator. In this way a degree of redundancy is enabled, so that the system is protected against failure. It is also possible to hydraulically separate both hydraulic circuits of the pedal travel simulators from each other in a parallel connection, so that if there is a leak in one circuit, the other circuit remains operational.

In an alternative embodiment of the present invention, the pedal travel simulators are hydraulically connected to one another in series. The pedal travel simulators are thus configured one after the other. Through addition of the spring forces, the pedal travel simulators can be made smaller than in the case of a parallel connection. This in turn saves installation space.

In another preferred embodiment of the present invention, the pedal travel simulators have plate springs. A plate spring has a much higher stiffness compared to a coil spring. Despite its high stiffness, a plate spring of this type can be accommodated in a space-saving manner. A spring with high stiffness and low installation space can thus be provided.

According to an example embodiment of the present invention, preferably, at least one of the pedal travel simulators has an additional coil spring. The coil spring and the plate spring are thus used together. The coil spring and the plate spring are here configured in such a way that the coil spring is deformed first. Through such a combination, a lower spring stiffness is provided at the beginning, which simulates a building brake pressure at the brake pedal. Through such a combination, a more realistic braking feel is simulated at the brake pedal.

In an advantageous further development of the present invention, the spring stiffness of the two pedal travel simulators is selected such that the plate springs compress sequentially or parallel to each other. When the two plate springs are compressed in parallel, the total force on the brake pedal results from the sum of the two spring forces. With this type of spring compression, the two plate springs can be made smaller, so that installation space is saved. In the case of sequential compression, the magnitude of the spring stiffness is advantageously selected such that the second pedal travel simulator does not compress until the first pedal travel simulator is fully activated. As a result, a higher counterforce can be generated at the brake pedal, compared with a parallel compression, despite the smaller installation space of the pedal travel simulators.

Advantageously, according to an example embodiment of the present invention, the receptacles for the pedal travel simulators are configured diagonally to the power cylinder bore. A diagonal configuration of the pedal travel simulators has the advantage that they can be provided in the hydraulic block in a way that saves installation space. The diagonal configuration also leaves sufficient space above the lower pedal travel simulator for hydraulic bores in order to hydraulically connect the individual components with one another. In addition, sufficient space is provided below the upper pedal travel simulator for an electrical connection of the power cylinder motor.

In another advantageous embodiment of the present invention, a control unit is attached to the hydraulic block, situated on a side of the hydraulic block at which the pedal travel simulators extend over the hydraulic block. Advantageously, here both pedal travel simulators are configured in such a way that they extend over the hydraulic block in the same direction. According to the present invention, the pedal travel simulators extend into an interior region of the control device. By accordingly situating the components within the control device, the hydraulic block can be provided with the control unit in a manner that saves installation space.

According to an expedient embodiment of the present invention, receptacles of a first and second collector chamber of a brake fluid collector are arranged in the hydraulic block, each of which is connected to one of the pedal travel simulators via a separate hydraulic line. The hydraulic circuits of the first and second pedal stroke simulators are separated from each other by the separate hydraulic line and the separate collector chambers, so that if there is a leak in one of the circuits, the other circuit remains operational. This increases the safety of such a system.

According to another expedient embodiment of the present invention, a single simulator control valve is connected in the hydraulic block upstream of the pedal travel simulators. The master brake cylinder can be separated from the pedal travel simulators via this simulator control valve, so that in the event of a defect in the pedal travel simulators the brake fluid can be conducted directly to the brakes. This simulator control valve is advantageously closed when currentless, so that braking via the master cylinder is possible even if the valve or the power supply is defective. This increases the safety of the brake system.

According to present invention, a brake system is additionally provided which includes a first unit having a brake fluid reservoir and a master brake cylinder, a second unit having a hydraulic block according to the present invention, and a third unit having a driving dynamics control system, all units being hydraulically connected to each other. With such a braking system, the advantages described above may be achieved.

Exemplary embodiments of the present invention are shown in the figures and explained in more detail in the following description.

DETAILED DESCRIPTION OF EXAMPLE EMBODIMENTS

Figure 1:
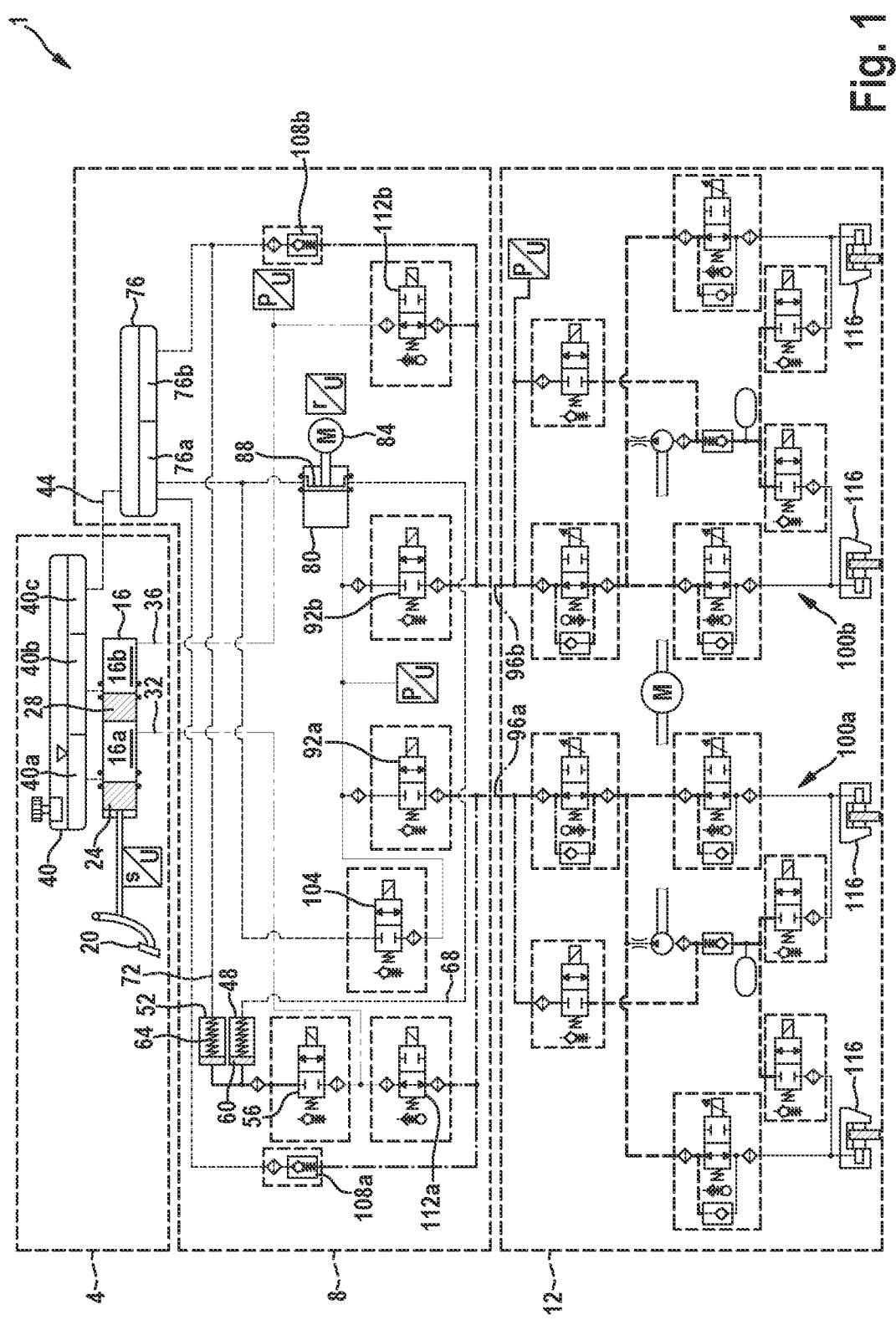
FIG. 1 shows a brake system according to an exemplary embodiment of the present invention.

FIG. 1 shows a brake system 1 according to an exemplary embodiment of the present invention. Here the brake system 1 has three separate units 4, 8, 12. A first unit 4 includes a master brake cylinder 16, which is controlled via a brake pedal 20. Master cylinder 16 includes two pistons 24, 28 that are movable in cylinder 16 and divide master cylinder 16 into two cylinder chambers 16a, 16b. First piston 24 conveys brake fluid to a first master cylinder connector 32, while second piston 28 conveys the brake fluid to a second master cylinder connector 36. The first unit 4 also has a brake fluid reservoir 40 divided into three reservoir chambers 40a, 40b, 40c, each cylinder chamber 16a, 16b of master brake cylinder 16 being hydraulically connected to a different chamber 40a, 40b to supply brake fluid to master brake cylinder 16.

A second unit 8 is connected to both master cylinder connectors 32, 36. Additionally, second unit 8 has a reservoir connector 44 for third reservoir chamber 40c of brake fluid reservoir 40. Second unit 8 additionally includes two pedal travel simulators 48, 52 connected in parallel, which are connected to first master cylinder connector 32 via a simulator control valve 56. The pedal travel simulators 48, 52 each have a simulator piston with a spring 64 that acts against the pressure of the first master cylinder connector 32 to simulate a braking feel. On a rear side, pedal travel simulators 48, 52 are each connected to first and second collector chambers 76a 76b of a brake fluid collector 76 via a separate hydraulic line 68, 72.

Second unit 8 also has a power cylinder 80 in which a power cylinder piston 88, drivable by a power cylinder motor 84, is movable to build up braking pressure. The power cylinder 80 is connected via two switching valves 92a, 92b to a first and a second driving dynamics control connector 96a, 96b, via which two brake circuits 100a, 100b of a third unit 12, designed as a driving dynamics control system, are supplied with brake fluid. Power cylinder 80 is connected, for the supply of brake fluid, to first collector chamber 76a of brake fluid collector 76 via a supply valve 104.

To provide an adequate supply of brake fluid to the driving dynamics control connectors 96a, 96b, each connector 96a, 96b is connected to brake fluid collector 76 via a check valve 108a, 108b that opens in the direction of the connector 96a, 96b. First driving dynamics control connector 96a is here connected to first collector chamber 76a of brake fluid collector 76, whereas second driving dynamics control connector 96b is supplied with brake fluid via second collector chamber 76b of brake fluid collector 76. In order to enable continued application of brake pressure in the event of a malfunction of power cylinder 80, each master cylinder connector 32, 36 is connected to one of the driving dynamics control connectors 96a, 96b via a separate isolation valve 112a, 112b. This isolation valve 112a, 112b permits a flow through in the unswitched position.

In second unit 8, simulator control valve 56, switching valves 92a, 92b, and supply valve 104 are designed as 2/2-way valves which block a connection in the unswitched position. Only the isolating valves 112a, 112b, also designed as 2/2-way valves, permit flow in an unswitched position.

Driving dynamics control unit 12 has a conventional valve circuit, via which two wheel brakes 116 can be controlled for each brake circuit 100a, 100b, and via which, for example, an ESP braking function can be realized. Here the circuitry will not be discussed in more detail.

Figure 2:
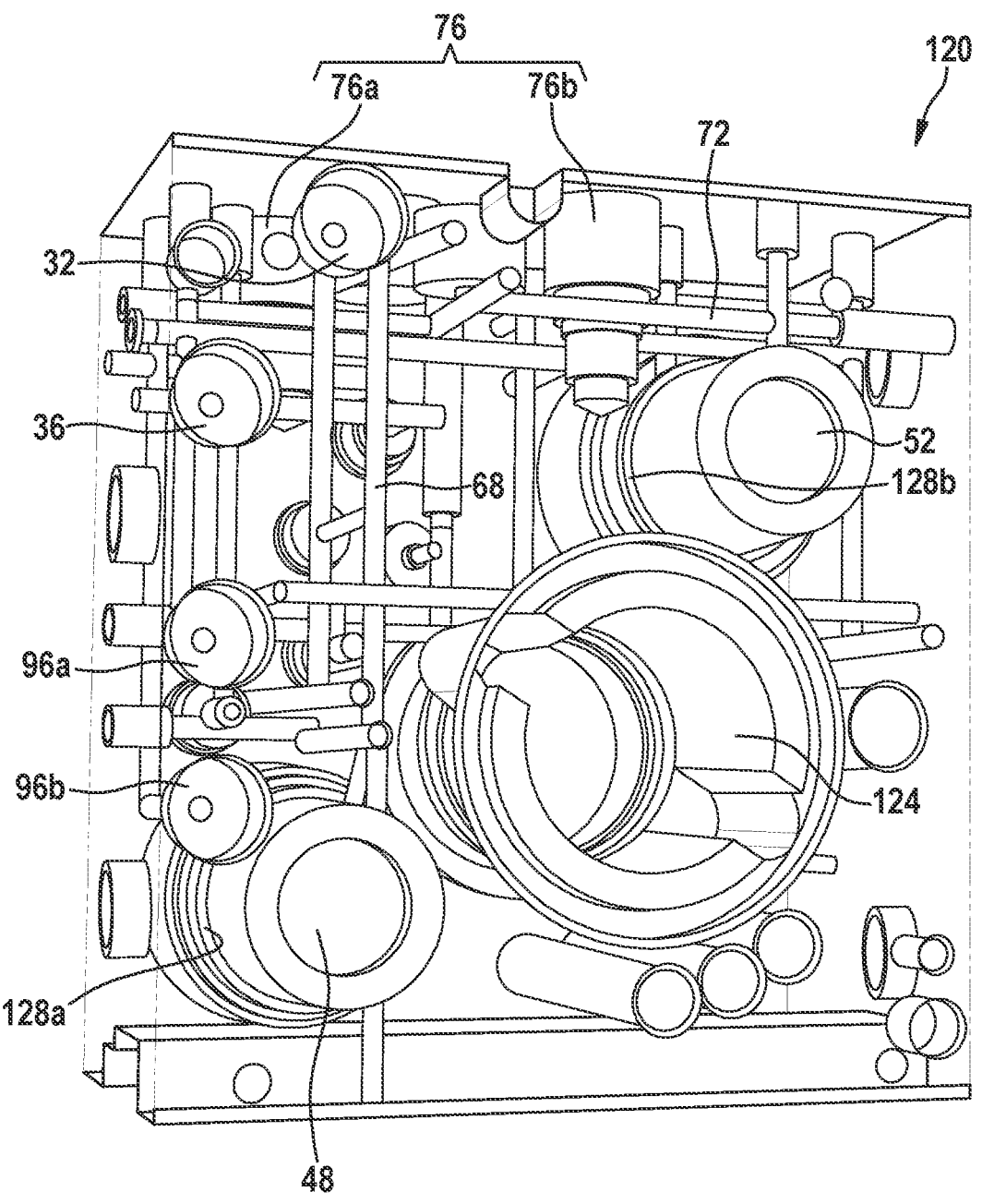
FIG. 2 shows an exemplary embodiment of a hydraulic block, according to the present invention.

FIG. 2 shows an embodiment of a hydraulic block 120 according to the present invention. With this hydraulic block 120, second unit 8 of braking system 1 is realized. Hydraulic block 120 is here formed as a cuboid housing block, which may be manufactured for example by extrusion. Hydraulic block 120 has a power cylinder bore 124 in which the power cylinder 80 can be accommodated. Likewise, two receptacles 128*a*, 128*b* for pedal travel simulators 48, 52 are formed in hydraulic block 120. Pedal travel simulators 48, 52 are here configured diagonally to power cylinder bore 124.

Above power cylinder bores 124 are formed first and second master cylinder connectors 32, 36, via which hydraulic block 120 is connected to master brake cylinder 16. Driving dynamics control connectors 96*a*, 96*b*, for connection to driving dynamics control unit 12, are formed below master cylinder ports 32, 36. Hydraulic block 120 also includes first and second collector chambers 76*a*, 76*b* of brake fluid collector 76. These collector chambers 76*a*, 76*b* are formed in hydraulic block 120 on an upper side. The separate hydraulic lines 68, 72 to pedal travel simulators 48, 52 are formed as bores in hydraulic block 120.

Figure 3:
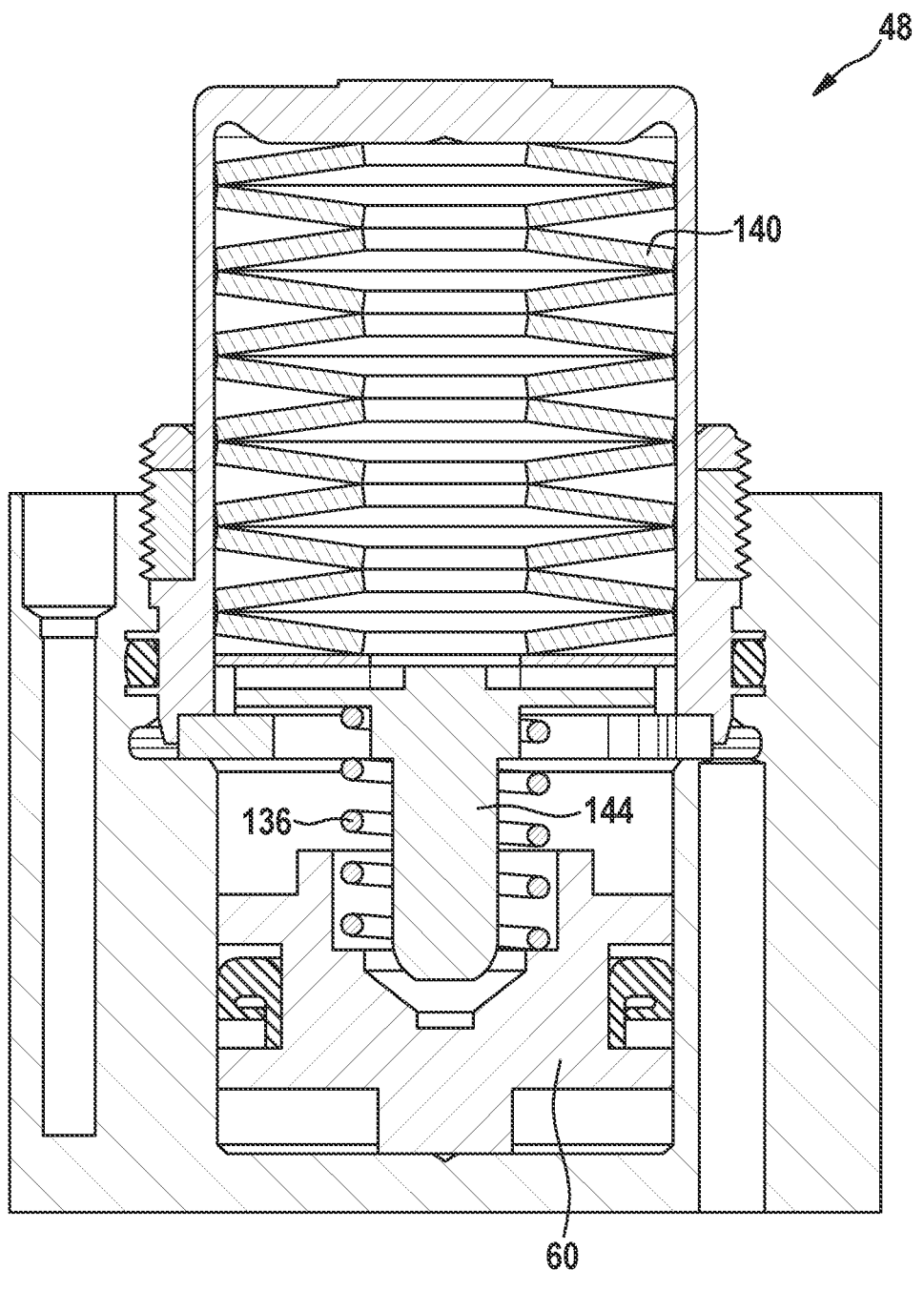
FIG. 3 shows a pedal travel simulator according to an exemplary embodiment of the present invention.

FIG. 3 shows an exemplary embodiment of a pedal travel simulator 48, 52. Pedal travel simulator 48, 52 includes simulator piston 60, which is held in an initial position by a coil spring 136. Pedal travel simulator 48, 52 also has a plate spring 140 which is held below a plunger 144 on which coil spring 136 is supported. When hydraulic pressure is applied to a side of simulator piston 60 opposite plate spring 136, plate spring 136 is first compressed. After a travel of simulator piston 60, it comes into contact with plunger 144, thereby compressing plate spring 140. A lower counterforce is thus generated by coil spring 136 than by plate spring 140, so that a soft braking feel is generated at brake pedal 20. In the diagram of FIG. 1, only first pedal travel simulator 48 is formed with a coil spring 136, so that such a spring 136 can be omitted for second pedal travel simulator 52.

Figure 4:
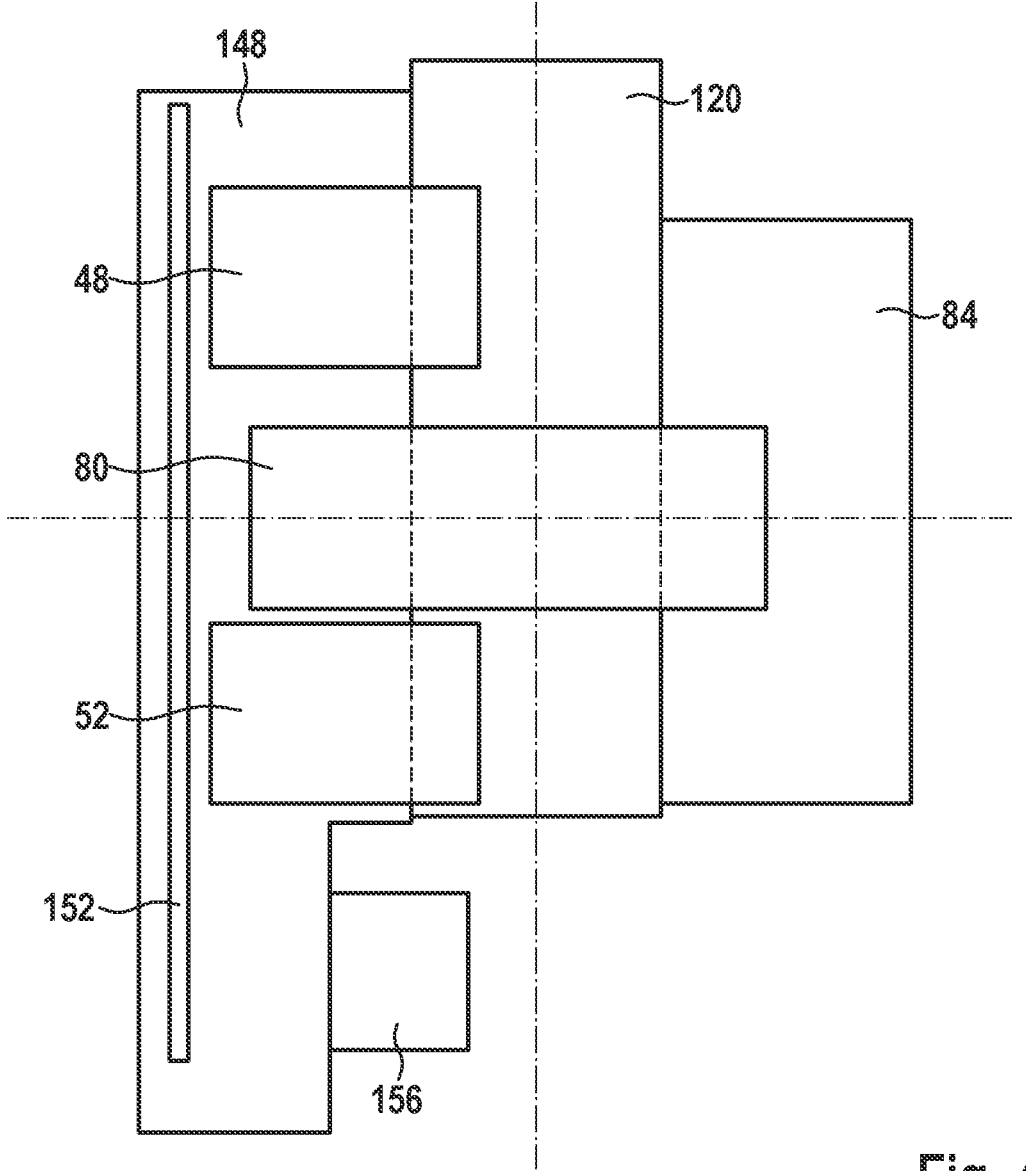
FIG. 4 shows a schematic representation of the hydraulic block with control unit and power cylinder motor, according to an example embodiment of the present invention.

FIG. 4 shows a schematic view of hydraulic block 120 with control device 148 and power cylinder motor 84, in a plan view. In this figure, it can be seen that pedal travel simulators 48, 52 are located at both sides of power cylinder 80. At one side of hydraulic block 120, power cylinder motor 84 is provided, via which power cylinder piston 88 situated in power cylinder 80 can be moved. Control device 148 is arranged on a side facing away therefrom. Control device 148 includes a circuit board 152 and an electrical plug 156. The figure additionally shows that both power cylinder 80 and pedal travel simulators 48, 52 extend into control device 148. Such a configuration can save installation space.

What is claimed is:

1. A hydraulic block of a power brake system, wherein the hydraulic block is formed as a cuboid housing block including a power cylinder bore configured to receive a power cylinder, the hydraulic block having has two receptacles for pedal travel simulators and being configured so as to be hydraulically connectable to a master brake cylinder, a brake fluid reservoir, and a driving dynamics control system, wherein receptacles of a first and second collector chamber of a brake fluid collector are situated in the hydraulic block, each of which is connected to one of the pedal travel simulators via a separate hydraulic line.

2. The hydraulic block as recited in claim 1, wherein the pedal travel simulators are hydraulically connected in parallel to one another.

3. The hydraulic block as recited in claim 1, wherein the pedal travel simulators have plate springs.

4. The hydraulic block as recited in claim 3, wherein at least one of the pedal travel simulators includes a coil spring.

5. The hydraulic block as recited in claim 3, wherein a spring stiffness of the two pedal travel simulators is selected such that the plate springs compress sequentially or parallel to each other.

6. The hydraulic block as recited in claim 1, wherein a control device is fastened to the hydraulic block, the control device being situated on a side of the hydraulic block at which the pedal travel simulators extend over the hydraulic block.

7. The hydraulic block as recited in claim 1, wherein a single simulator control valve is connected upstream of the pedal travel simulators in the hydraulic block.

8. A brake system, comprising:
   a first unit with a brake fluid reservoir and a master brake cylinder;
   a second unit with a hydraulic block, the hydraulic block being formed as a cuboid housing block including a power cylinder bore configured to receive a power cylinder, the hydraulic block having has two receptacles for pedal travel simulators and being configured so as to be hydraulically connectable to the master brake cylinder, the brake fluid reservoir, and a driving dynamics control system, wherein receptacles of a first and second collector chamber of a brake fluid collector are situated in the hydraulic block, each of which is connected to one of the pedal travel simulators via a separate hydraulic line; and
   a third unit with the driving dynamics control system;
   wherein the first, second, and third units are hydraulically connected to one another.

* * * * *